United States Patent
Weissman et al.

(10) Patent No.: US 6,295,602 B1
(45) Date of Patent: Sep. 25, 2001

(54) EVENT-DRIVEN SERIALIZATION OF ACCESS TO SHARED RESOURCES

(75) Inventors: Gregg D. Weissman, Los Gatos; Gregory W. Dalcher, Placerville, both of CA (US)

(73) Assignee: Spyrus, Inc., San Jose, CA (US)

( * ) Notice: Subject to any disclaimer, the term of this patent is extended or adjusted under 35 U.S.C. 154(b) by 0 days.

(21) Appl. No.: 09/468,028

(22) Filed: Dec. 20, 1999

Related U.S. Application Data

(60) Provisional application No. 60/114,173, filed on Dec. 30, 1998.

(51) Int. Cl.[7] .................................................. G06F 9/00
(52) U.S. Cl. .............................. 713/1; 713/100; 709/104
(58) Field of Search ........................ 713/1, 100; 709/102, 709/103, 104, 105

(56) References Cited

U.S. PATENT DOCUMENTS

| | | | |
|---|---|---|---|
| 4,809,168 | * 2/1989 | Hennessy et al. | ................... 709/104 |
| 4,961,224 | * 10/1990 | Yung | ...................................... 380/25 |
| 5,774,731 | * 6/1998 | Higuchi et al. | ...................... 710/200 |
| 6,047,307 | * 4/2000 | Radko | .................................. 709/100 |

* cited by examiner

*Primary Examiner*—Dennis M. Butler
(74) *Attorney, Agent, or Firm*—David R. Graham

(57) ABSTRACT

The invention mediates use of a computer resource by multiple events that seek to use the computer resource at the same time. In particular, the invention mediates such use by events that seek to use the computer resource at times that are not known until access to the computer resource is sought. Advantageously, the invention enables mediation of the use of a computer resource when typical operating system functionality provided for that purpose is ineffective. The invention allows work initiated by an event granted access to a resource to be completed by a different, interrupting event.

1 Claim, 5 Drawing Sheets

EVENT-DRIVEN SERIALIZATION OF ACCESS TO SHARED RESOURCES

CROSS-REFERENCE TO RELATED APPLICATION

This application claims benefit of prior U.S. patent application Ser. No. 60/114,173, filed Dec. 30, 1998, now abandoned.

BACKGROUND OF THE INVENTION

1. Field of the Invention

This invention relates to mediating the use of a computer resource by multiple events that seek to use the computer resource at the same time and, in particular, that seek to use the computer resource at times that are not known until access to the computer resource is sought.

2. Related Art

A computer includes a variety of mechanisms for performing various operations in accordance with achieving the functionality of the computer. (Herein, "computer" can refer to any computational device). Such mechanisms can be referred to as "computer resources."

During use of a computer, various operations ("events") occur in response to stimuli originating in various parts of the computer system and associated hardware, each of which can cause use of one or more computer resources. An "event" is an execution context that is entered into and interrupts a current execution context. An "execution context" is the minimal computer system state and program counter location information that needs to be preserved in order to allow the operating system to switch among different paths of instruction execution. An event may necessitate use of a computer resource while that resource is already in use, either in the context of the main program flow of the computer system or in response to a prior event. Further, the need of the event to use the computer resource will generally not be known until access to the computer resource is sought by the event. Additionally, some computer resources cannot be simultaneously used by multiple events. In such situations, it is necessary to mediate use of the computer resource by the events.

Such mediation can be accomplished using synchronization services (e.g., "mutex," "semaphore" or "critical section" services, as known to those skilled in the art) provided by the operating system of the computer. Each event is associated with a "thread" (processor execution context). A sequence of instructions being executed by the computer, and the hardware context associated therewith, is termed a "thread," of which there can be several in a computer system. Only one thread executes on a processor at a time. The general implementation of modern operating systems is to have a scheduling and dispatching algorithm select from the available pending contexts one which is to be made active. At that time, the context is made the current context, where the state includes where the processor should continue executing instructions. The processor is then said to be executing the "current thread." Each event that occurs is associated with a "thread," but not necessarily a specific or predictable thread. That is, an event may occur in response to an external stimulus causing an interrupt of the processor and this may cause instructions to be executed which preserve some minimal state or context of the current thread, and then transfer control to a different program counter location. Additional levels of complexity in scheduling may be present such that the event is queued for later processing, but that later processing may still interrupt the normal flow of control associated with the current thread. The salient characteristic of event handling is that it causes the current program location of a thread to be saved and the processor to start executing different instructions associated with the particular event. At some point, the instructions stream for handling the event causes a return to the instructions stream associated with the thread that was interrupted. When an event ("pre-empting event") seeks to use a resource that is already being used by another event ("executing event"), the thread of which the pre-empting event is part is stopped until the thread including the event that is using the resource is finished using that resource.

However, when an event seeks to use a resource that is already in use, it may not be possible to use operating system synchronization services. For example, the resource may be in use by an event already, with the two events sharing a single thread for the purposes of the operating system's synchronization services. If the pre-empting event causes the operating system to stop dispatching of the thread, then the processing for the first event cannot complete. Since the pre-empting event is waiting for the first event to complete, the thread will have entered the state known as "deadlock." Additionally, some operating systems explicitly forbid the use of synchronization services when processing events. This makes it highly desirable to devise a mechanism which will mediate among multiple events competing for use of the same resource.

SUMMARY OF THE INVENTION

The invention mediates use of a computer resource by multiple events that seek to use the computer resource at the same time. In particular, the invention mediates such use by events that seek to use the computer resource at times that are not known until access to the computer resource is sought. Advantageously, as will be clearer from the description below, the invention enables mediation of the use of a computer resource when typical operating system functionality provided for that purpose is ineffective. The invention allows work initiated by an event granted access to a resource to be completed by a different, interrupting event.

DETAILED DESCRIPTION OF THE INVENTION

The invention mediates use of a computer resource by multiple events that seek to use the computer resource at the same time. In particular, the invention enables such mediation when the time at which an event seeks to access the computer resource is not known until access to the computer resource is sought. Advantageously, the invention enables such mediation for situations in which typical operating system functionality is ineffective. The invention can enable such mediation when the events are part of the same thread.

The invention makes use of the execution context from each new event that seeks to use a computer resource, without regard to when the event occurs, to check on the status of the resource (i.e., whether the resource is being used by another event) and to complete usage of the resource by that other event prior to enabling usage of the resource by the new event.

The invention can advantageously be used, for example, to insert token processing into a data stream coming from a hard disk driver during READ operations. More generally, the invention enables control of when each disk read event gets access to the resources that must be shared by all such events.

Figure 1:
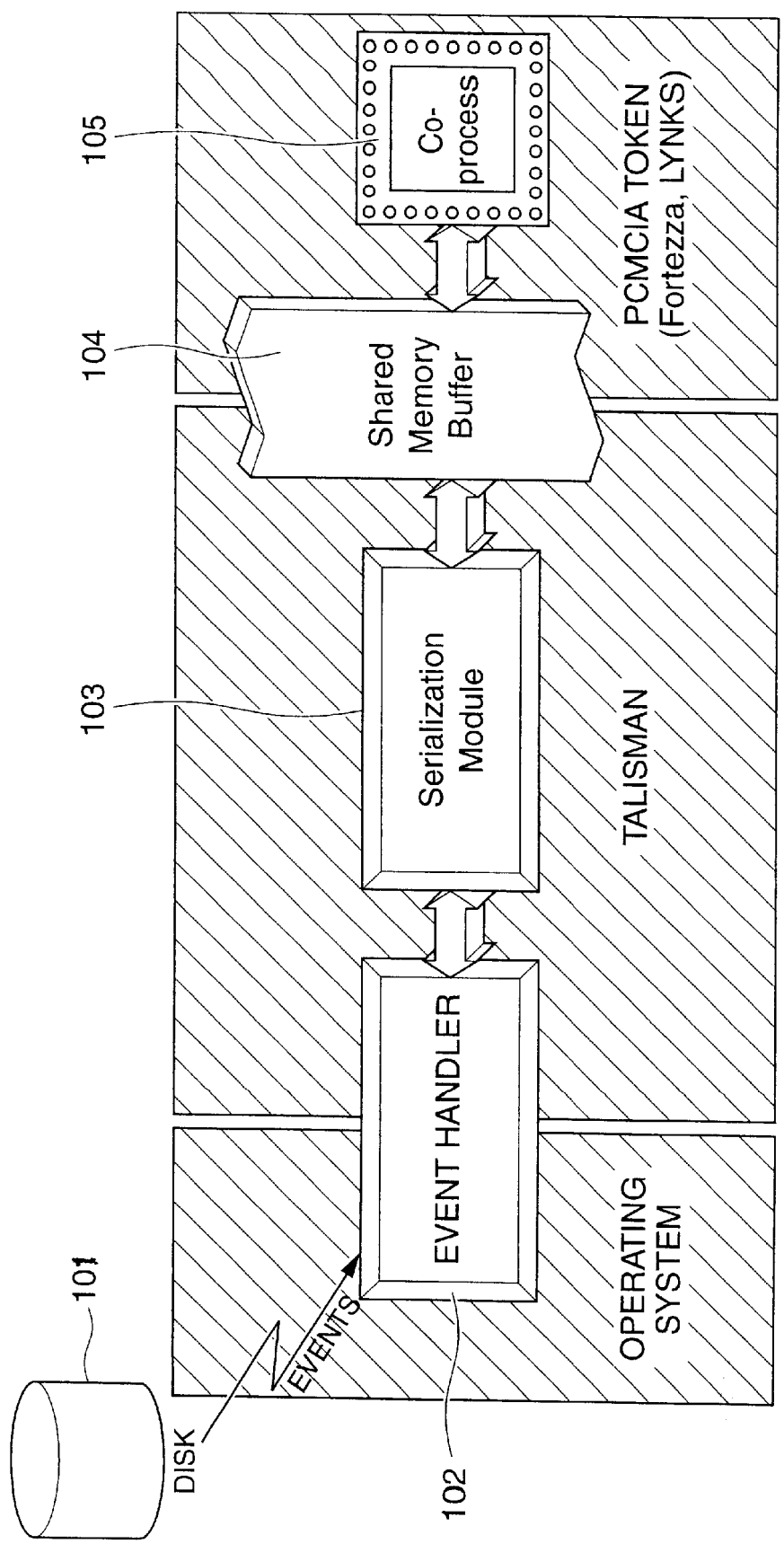
FIG. 1 is a block diagram illustrating a use of the invention.

FIG. 1 is a block diagram illustrating a use of the invention. In FIG. 1, data that is stored on a data storage device 101 is to be retrieved and processed by a processing device 105 (e.g., a cryptographic processing device). A second processing device (not shown), operating under control of an appropriate computer program, causes multiple sets of data (which can include any amount of data, to whatever degree of granularity "data" is defined) to be read from the data storage device 101. Each set of data read from the data storage device 101 is transferred to an event handler 102. The event handler 102 notifies a serialization module 103 when a set of data has been retrieved by the data storage device 101 and is ready for processing by the processing device 105. Prior to and after processing by the processing device 105, each set of data is stored in a shared memory buffer 104. The available memory in the shared memory buffer 104 is such that only one set of data can be stored at a time. As described in more detail below, in accordance with a method according to the invention, the serialization module 103 mediates the transfer of sets of data into and out of the shared memory buffer 104 so that only a single set of data is provided to the shared memory buffer 104 (and, thus, to the processing device 105) at a time.

While FIG. 1 illustrates the use of the invention to mediate storage in a memory buffer of sets of data that are retrieved from a data storage device for processing by a processing device 105, it is to be understood that the invention can, more generally, be used for mediating the use of any computer resource by any series of events, where only one event may make use of the computer resource at a time and the events seek to use the computer resource at times that are not known until access is sought.

Figure 2:
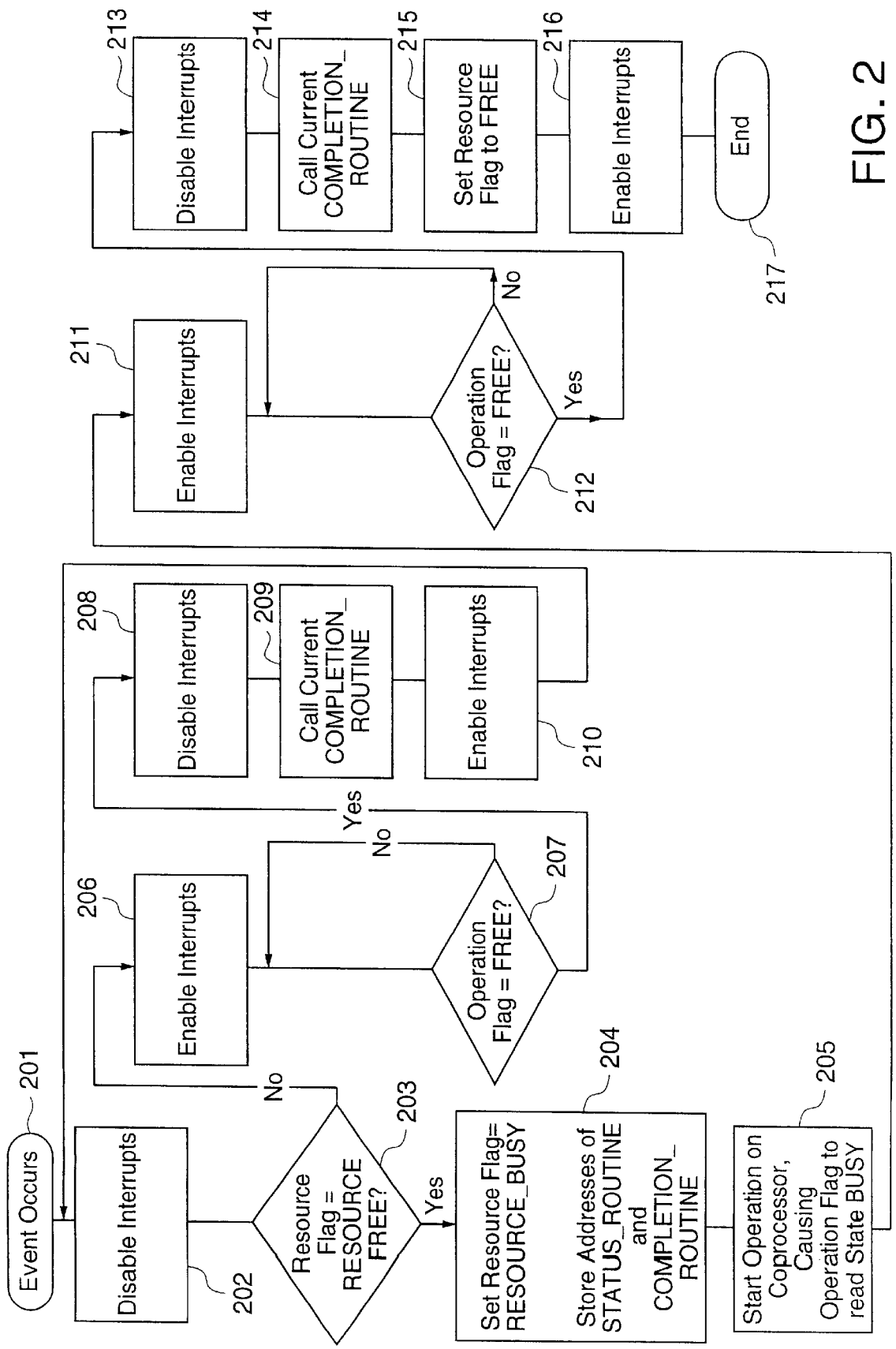
FIG. 2 is a flow chart of a method according to the invention.

FIG. 2 is a flow chart of a method 200 according to the invention. The method 200 enables an event to make use of a resource that may already be in use by another event. As indicated above, in FIG. 1, the method 200 is implemented in the serialization module 103.

As shown by block 201, an event occurs. (For convenience, this event is sometimes referred to hereafter as the "current event.") For example, in FIG. 1, the event handler 102 can receive notification that a set of data has been read from the data storage device 101 and is ready to be processed by the processing device 105. The occurrence of an event is not a step of a method according to the invention, but is the catalyst for performance of such method.

In step 202, interrupts to the method 200 are disabled. The disabling of interrupts is known to those skilled in the art. As will be clearer from the description below and consideration of FIG. 2, interrupts are disabled at this point to prevent subsequent events from interrupting the method 200 while the method 200 checks the status of the computer resource to determine availability for use by the current event.

In step 203, a resource usage status indicator is checked to determine whether the resource is being used by another event. Generally, this can be done by checking the value of a flag or variable that is established for indicating the usage status of the resource.

If the resource is not being used, then, in step 204, the value of the resource usage status indicator is set to indicate that the resource is being used. Additionally, the memory addresses of two sets of computer instructions, one for checking the status of a resource and the other for monitoring completion of use of a resource by an event, are stored. As will be apparent from the description below, these sets of instructions are used in preventing an "interrupting event" from using a resource while another event uses that resource.

In step 205, the current event is allowed to make use of the resource. An operation indicator (which can be a flag established for that purpose) indicates whether an operation is being performed by the resource. The value of the operation indicator is established to indicate that an operation is occurring. The steps of the method 200 during use of the resource by the current event are described in more detail below with respect to steps 211 through 216.

If, in step 203, the resource usage status indicator indicates that the resource is being used, then the current event is an interrupting event. Before the interrupting event can use the resource, the event already using the resource, as well as any other events that are waiting to use the resource, must complete usage of the resource before the current (interrupting) event can make use of the resource.

In step 206, interrupts are enabled again. The enabling of interrupts is known to those skilled in the art. Interrupts are enabled at this point to again allow events seeking to use the resource to communicate that need to the method 200 while the method 200 is processing the current event.

In step 207, the operation indicator is checked to determine whether operations are being performed by the resource. This check is continually performed until the operation indicator indicates that the resource is no longer performing operations.

Once the resource is no longer performing operations, then, in step 208, interrupts are disabled again.

In step 209, a set of instructions are executed in accordance with the completion of use of the resource by the event that had been using the resource. In particular, the status of the resource usage status indicator is changed to indicate that the resource is no longer being used, thus communicating to other events—and, in particular, events that may be waiting to use the resource—that the resource is again available for use.

In step 210, interrupts are again enabled.

Before the interrupting event can begin to use the resource, a determination must be made that no other event has begun to use the resource. The method 200 returns to the step 202 which disables interrupts again. In step 203, the resource usage status indicator is again checked to determine whether the resource is being used by another event. If not, then the interrupting event gains control of the resource and uses the resource until no longer needed (steps 204, 205 and 211 through 216). If so, then the interrupting event again monitors usage of the resource by the other event (steps 206 through 210) until that usage is complete. The interrupting event continues to check the availability of the resource (step 203) and monitor the usage of the resource (steps 206 through 210) until the resource is available for use by the interrupting event.

When the resource is available for use by the current (interrupting) event, and after the value of the operation indicator has been changed to indicate that the resource is being used by an event, the method 200 continues in a manner similar to that described above with respect to steps 206 through 210 which enable an interrupting event to monitor usage of a resource by another event.

In step 211, interrupts are enabled again. In step 212, the operation indicator is checked to determine whether operations are being performed by the resource, the check being continually performed until the operation indicator indicates that the resource is no longer performing operations. Once the resource is no longer performing operations, then, in step 213, interrupts are disabled again. In step 214, a set of instructions are executed in accordance with the completion of use of the resource by the current event, in particular changing the status of the resource usage status indicator to indicate that the resource is no longer being used.

In step 215, the value of the resource usage status indicator is changed to reflect that the resource is no longer in use by the current event, thus indicating to other events that the resource is now available for use by another event.

In step 216, interrupts are again enabled. As shown by block 217, the method 200 ends, i.e., indicating that the method of the invention has finished mediating use of the resource by the current event.

Figure 3:
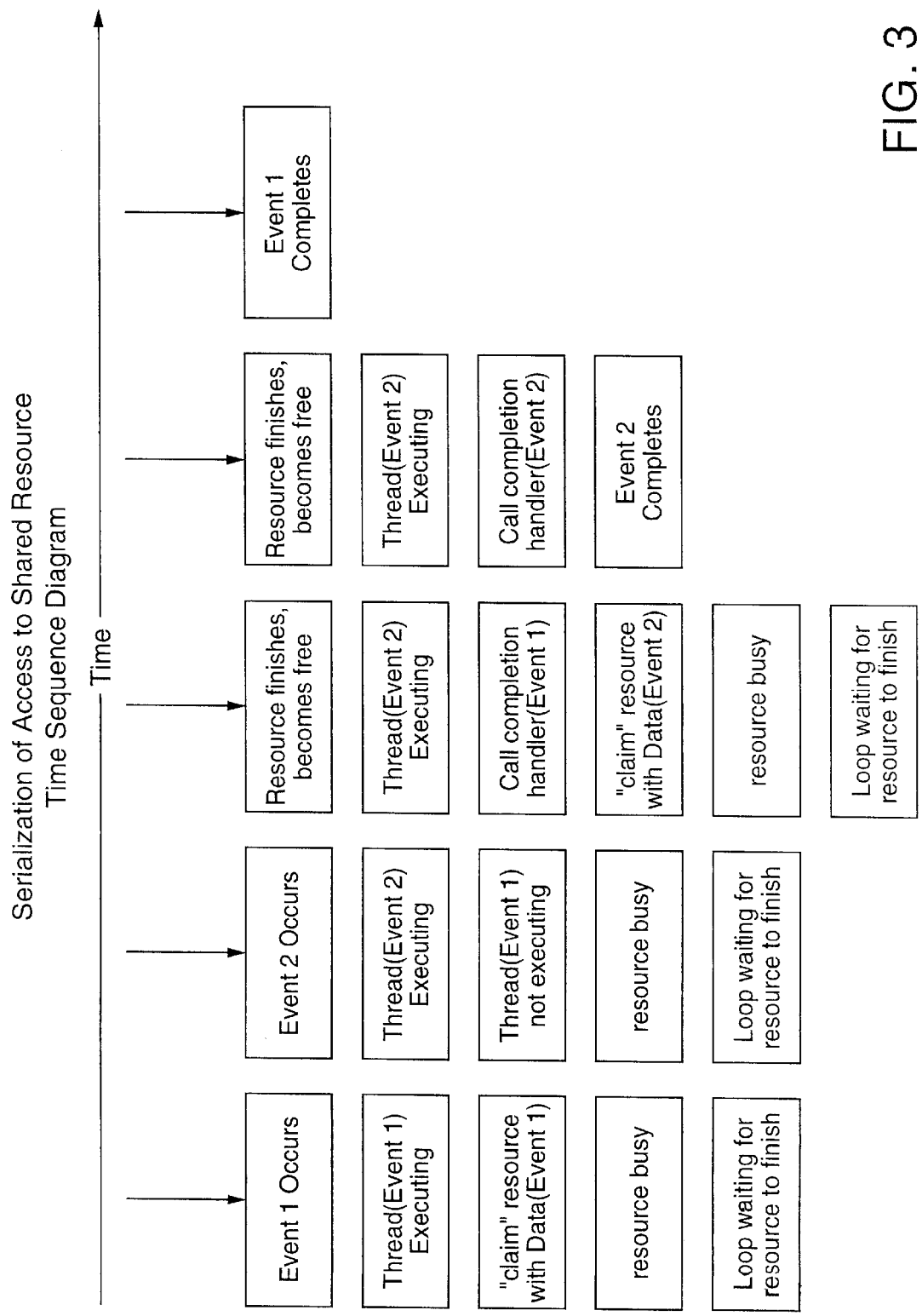
FIG. 3 is a diagram illustrating the timing of various aspects of an attempt by one event to access a computer resource while another event is making use of the computer resoure.

FIG. 3 is a diagram illustrating the timing of various aspects of an attempt by one event to access a computer resource while another event is making use of the computer resource.

Figure 4A:
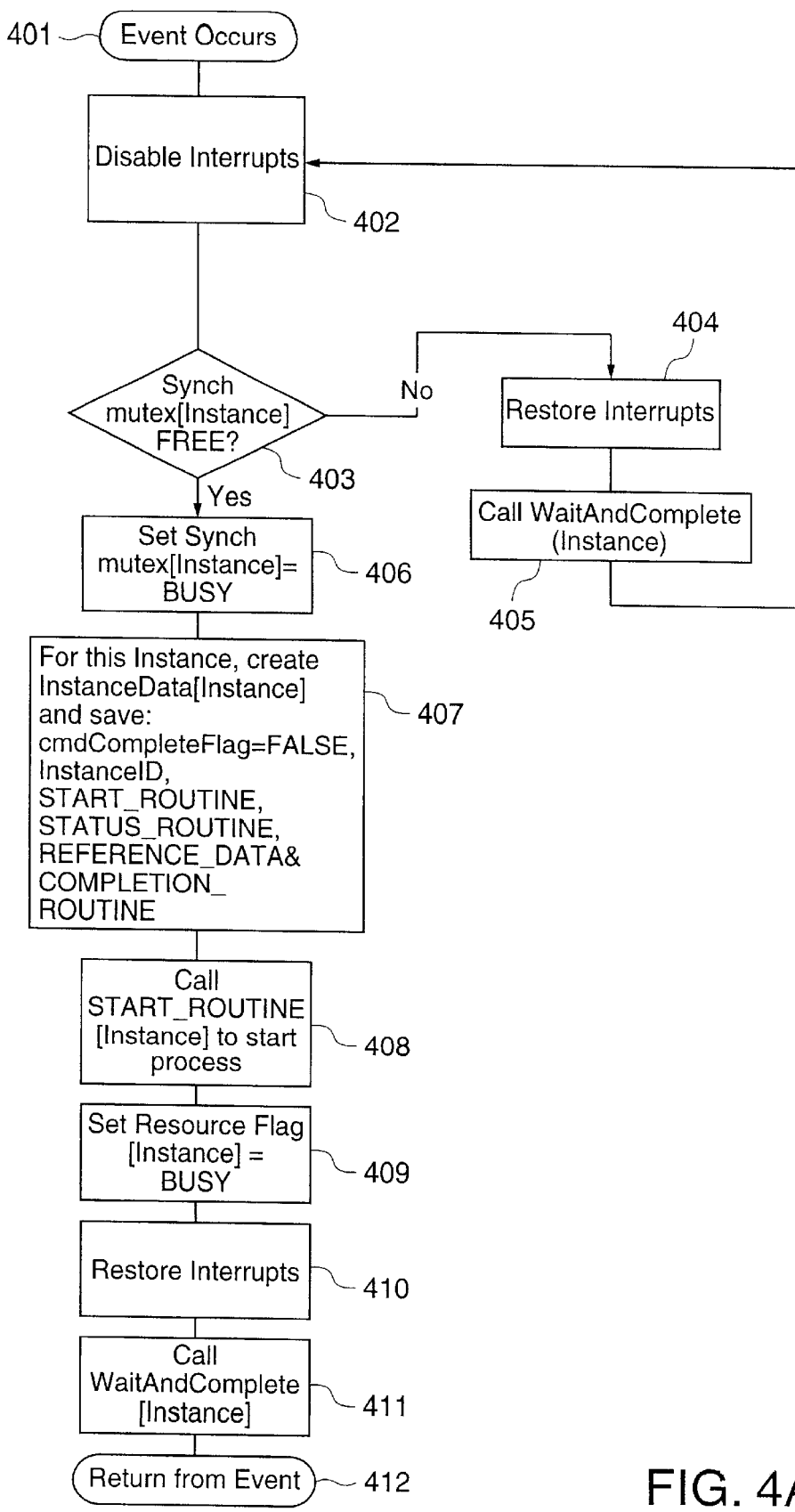
FIGS. 4A and 4B are, together, a flow chart of a method according to a particular embodiment of the invention.
Figure 4B:
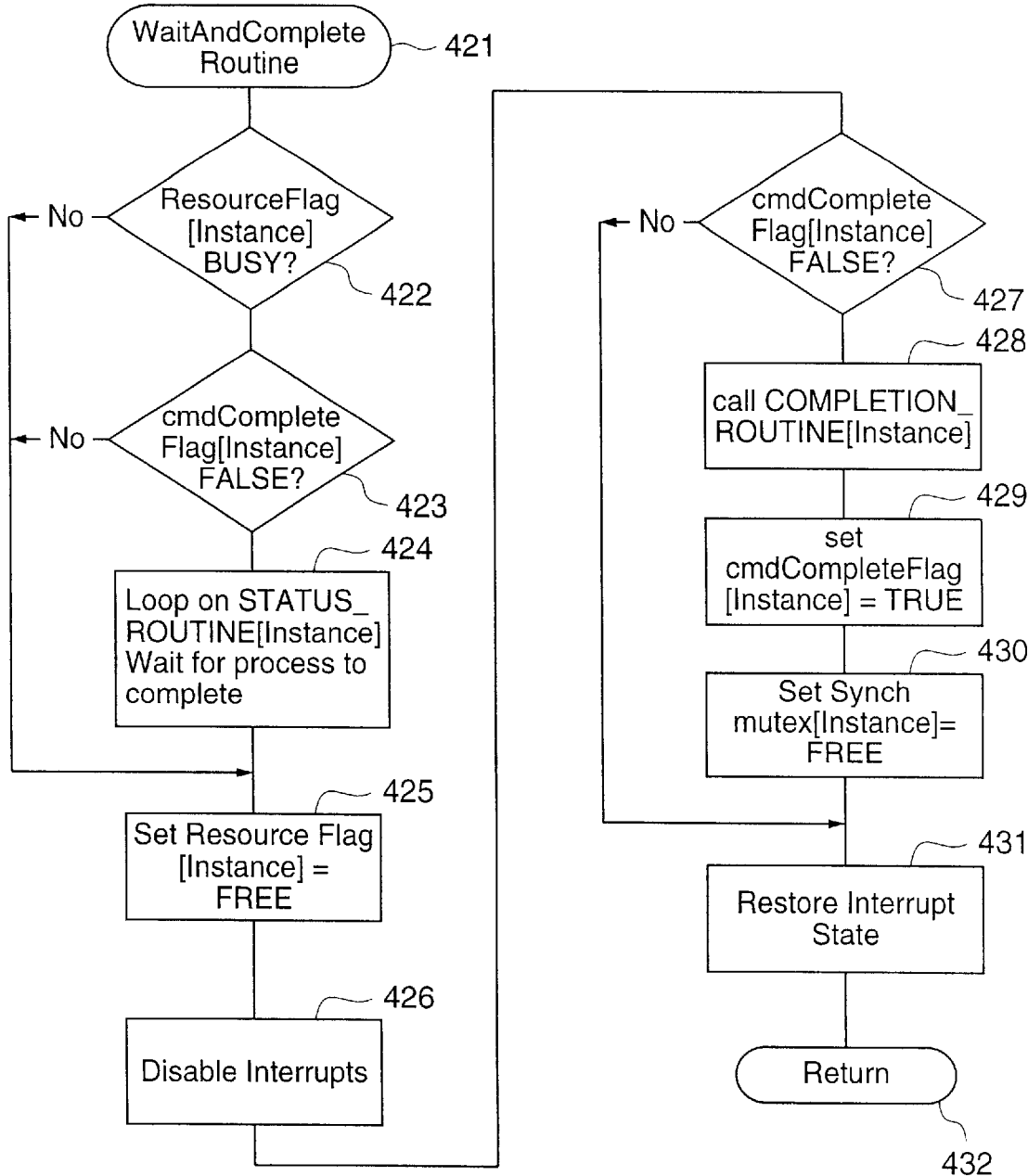

FIGS. 4A and 4B are, together, a flow chart of a method 400 according to a particular embodiment of the invention. The method 400 is similar to the method 200 described above with respect to FIG. 2, differing primarily in that aspects of a method according to the invention are described in more detail. Additionally, as will be apparent from the description below, the method 400 enables mediation of the use of multiple computer resources that can each be sought for use by multiple events at the same time. (In FIGS. 4A and 4B, the variable INSTANCE_NUMBER is used to indicate which resource the event needs to use.)

As shown by block 401 (FIGS. 4A and 4B), an event (the "current event") occurs. As indicated above, the occurrence of an event is not a step of the method 400, but is, rather, the catalyst for performance of the method 400.) Together with notification of the occurrence of an event, the method 400 is provided certain other information. The method 400 is provided with the beginning address (START_ROUTINE in FIGS. 4A and 4B) of a set of computer instructions that are used to begin, for the current event, processing associated with the computer resource (for convenience, sometimes referred to hereafter as "coprocessing"), i.e., in FIG. 1, to begin processing by the processing device 105. The method 400 is also provided with the beginning address (STATUS_ROUTINE in FIGS. 4A and 4B) of a set of computer instructions that are used to determine whether coprocessing has been completed for the event using the resource. The method 400 is also provided with the beginning address (COMPLETION_ROUTINE in FIGS. 4A and 4B) of a set of computer instructions that are used to send the results of the coprocessing from the resource to another part of the computer after coprocessing has been completed. Various other parameters (REFERENCE_DATA in FIGS. 4A and 4B), as can be appreciated by those skilled in the art, can also be provided to the method to enable processing of the above-described computer instructions.

In step 402, interrupts to the method 400 are disabled. This is done for the same reason as given above with respect to the step 202 of the method 200.

In step 403, a resource usage status indicator is checked to determine whether the resource is being used by another event. This can be done by checking the value of a variable (SynchMutex[INSTANCE_NUMBER] in FIGS. 4A and 4B) that stores the usage status for each of the resources for which usage is being mediated by the method 400.

If the resource that has been checked is being used by another event, then, the current event is an interrupting event. In step 404, the interrupt status is restored to the status prior to step 402.

Next, in step 405, a set of instructions (in FIGS. 4A and 4B, WaitAndComplete[INSTANCE_NUMBER]) is executed that, as appropriate, manages waiting for the completion of the use of a resource by event(s) other than the current event, and handles processed data produced as a result of use of the resource and/or associated processing by the current event. This set of instructions is described in more detail below. The functionality of this set of instructions is an important aspect of the invention: these instructions enable an interrupting event to allow the coprocessing of another event to be completed correctly without interference by an interrupting event.

Upon completion of the set of instructions executed in step 405, the method 400 returns to step 402 (in which interrupts are disabled) and, in step 403, checks the resource usage status indicator again to determine whether the resource is being used by still another event. Steps 402, 403, 404 and 405 are repeated until the resource status usage indicator indicates that the resource is available for use by the current event.

If, in step 403, a determination is made that the resource is not being used, then, in step 406, the value of the resource usage status indicator is set to indicate that the resource is being used. This prevents other interrupting events from gaining control of the resource while the current event uses the resource.

In step 407, a data structure (InstanceData[Instance] in FIGS. 4A and 4B) is created in which several values associated with the resource being accessed are stored for use in further processing by the method 400. The value of the variable INSTANCE_NUMBER for this resource can be related to the address of the data structure and/or can be stored in the data structure. Additionally, the values of START_ROUTINE, STATUS_ROUTINE, REFERENCE_DATA and COMPLETION_ROUTINE (discussed above) are stored in the data structure. The data structure also stores the value of a usage completion indicator (cmdCompleteFlag in FIGS. 4A and 4B) that is used to indicate completion of the set of computer instructions that are used to send the results of the coprocessing from the resource to another part of the computer after coprocessing has been completed. The value of this flag is established (i.e., FALSE) in this step to indicate that such set of computer instructions has not been completed.

In step 408, the coprocessing associated with the resource begins for the current event. The content of the coprocessing depends upon the application with which the invention is used. For example, in one application of the invention, the resource for which use is being mediated is a shared memory buffer that holds data before and after cryptographic processing. In that application, the coprocessing is the filling of the shared memory buffer with data in preparation for cryptographic processing and transmitting of data from the shared memory buffer to the cryptographic processor.

In step 409, the value of a coprocessing status indicator (ResourceFlag[Instance] in FIGS. 4A and 4B) is set to indicate that the coprocessing is ongoing. Together, the coprocessing status indicator (which represents the status of coprocessing) and the usage completion indicator (which represents the status of subsequent handling of the processed data) represent the complete status of the use of a resource.

In step 410, the interrupt status is restored to the status prior to step 402. The enablement of interrupts enables new events (interrupting events) to gain access to the method 400.

In step 411, the set of instructions is executed that manages waiting for the completion of the use of a resource by event(s) other than the current event, and handles processed data produced as a result of use of the resource and/or associated processing by the current event. As indicated above, this set of instructions is described in more detail below.

The end of the method 400 is indicated by the block 412.

FIGS. 4A and 4B also illustrates the steps of the method 400 that manage waiting for the completion of the use of a resource by event(s) other than the current event, and handling processed data produced as a result of use of the resource and/or associated processing by the current event, as discussed above. The block 421 indicates the beginning of this part of the method 400.

In steps 422 and 423, the values of the coprocessing status indicator and the usage completion indicator, respectively, are checked. If either indicates that an event is using the resource, then the method 400 proceeds to step 424. If the current event is not an interrupting event (i.e., if step 411 causes the method 400 to proceed to block 421), then the event using the resource is the current event, while if the current event is an interrupting event (i.e., if step 405 causes the method 400 to proceed to block 421), then an event other than the current event is using the resource.

In step 424, the set of computer instructions (STATUS_ROUTINE) is executed that determines whether coprocessing has been completed for the event using the resource. These instructions are continually executed until a determination has been made that coprocessing is complete.

In step 425, the value of the coprocessing status indicator is set to indicate that coprocessing is not ongoing. This is done so that subsequent use by an interrupting event of the steps of the method 400 shown in FIGS. 4A and 4B (i.e., subsequent performance of the step 405) will result in skipping of the steps 423 and 424 of the method 400.

In step 426, interrupts are disabled.

In step 427, the value of the usage completion indicator is checked. If the value of the usage completion indicator indicates that the sending of results of the coprocessing from the resource to another part of the computer has been completed (i.e., that the resource is no longer being used), then the method 400 proceeds to step 431 (discussed below). Otherwise, if an event is still using the resource, then the method 400 proceeds to step 428 (discussed below).

In step 428, the set of computer instructions are executed that are used to send the results of the coprocessing from the resource to another part of the computer after coprocessing has been completed. For example, in an application in which the invention is used to mediate use of a shared memory buffer that holds data before and after cryptographic processing, these instructions can be used to send processed data to a queued buffer.

In steps 429 and 430, the values of the usage completion indicator and the resource usage status indicator are set to indicate that usage of the resource has been completed and that the resource is no longer being used, thus allowing other events to gain control of the resource.

In step 431, the interrupt status is restored to the status prior to step 426.

In step 432, the method 400 returns to step 405 or 411, as appropriate.

Various embodiments of the invention have been described. The descriptions are intended to be illustrative, not limitative. Thus, it will be apparent to one skilled in the art that certain modifications may be made to the invention as described above without departing from the scope of the invention.

We claim:

1. A method for mediating the use of a computer resource by a series of events that seek access to the computer resource at times that are not known until access is sought, comprising the steps of:

identifying that a current event seeks to use the computer resource;

disabling interrupts to the method;

checking a resource usage status indicator associated with a resource to be used by the current event to determine whether the resource is being used by another event;

if the step of checking a resource usage status indicator indicates that the resource is being used, performing the following steps, then returning to the step of disabling:
  enabling interrupts to the method;
  checking the operation indicator to determine whether an operation is being performed by the resource, the step of checking the operation indicator being repetitively performed until the operation indicator indicates that the resource is no longer performing operations;
disabling interrupts to the method;
  setting the value of the resource usage status indicator to indicate that the resource is not being used; and
  enabling interrupts to the method; and
if the step of checking a resource usage status indicator indicates that the resource is not being used, performing the steps of:
  setting the value of the resource usage status indicator to indicate that the resource is being used;
  storing the memory address of a set of computer instructions for checking the status of a resource;
  storing the memory address of a set of computer instructions for monitoring completion of use of a resource by an event;
  setting an operation indicator to indicate that an operation is being performed by the resource;
  enabling interrupts to the method;
  checking the operation indicator to determine whether an operation is being performed by the resource, the step of checking the operation indicator being repetitively performed until the operation indicator indicates that the resource is no longer performing operations;
  disabling interrupts to the method;
  setting the value of the resource usage status indicator to indicate that the resource is not being used; and
  enabling interrupts to the method.

* * * * *